US012163277B2

(12) United States Patent
van den Berg et al.

(10) Patent No.: US 12,163,277 B2
(45) Date of Patent: Dec. 10, 2024

(54) COMPOSITE STRUCTURE WITH POLYURETHANE LAYERS, WHICH IS SUBSTANTIALLY FREE OF VOLATILE ORGANIC COMPOUNDS

(71) Applicant: Stahl International B.V., Waalwijk (NL)

(72) Inventors: Martinus Johannes van den Berg, Berkel-Enschot (NL); Rick Andreas Louis Janssen, Kaatsheuvel (NL); Maarten Jaspers, Malden (NL); Mark Dunning, Wageningen (NL); Luuk Lambertus Christina Olijve, Eindhoven (NL); Stefan Willem Mommers, Rosmalen (NL); Wouter Godefridus Antonius Vermeulen, Drunen (NL)

(73) Assignee: Stahl International B.V., Waalwijk (NL)

( * ) Notice: Subject to any disclaimer, the term of this patent is extended or adjusted under 35 U.S.C. 154(b) by 653 days.

(21) Appl. No.: 17/327,413

(22) Filed: May 21, 2021

(65) Prior Publication Data
US 2021/0277595 A1 Sep. 9, 2021

Related U.S. Application Data

(63) Continuation-in-part of application No. PCT/NL2019/050793, filed on Nov. 29, 2019.

(30) Foreign Application Priority Data

Nov. 30, 2018 (NL) ...................................... 2022103

(51) Int. Cl.
*D06N 3/14* (2006.01)
*B32B 27/40* (2006.01)

(52) U.S. Cl.
CPC ......... *D06N 3/145* (2013.01); *D06N 2211/28* (2013.01)

(58) Field of Classification Search
CPC .... D06N 3/145; D06N 2211/28; B32B 27/40; B32B 2266/0278; B32B 2375/00
See application file for complete search history.

(56) References Cited

U.S. PATENT DOCUMENTS

| | | | |
|---|---|---|---|
| 3,989,869 A | 11/1976 | Neumaier et al. | |
| 4,046,729 A | 9/1977 | Scriven et al. | |
| 4,066,591 A | 1/1978 | Scriven et al. | |
| 4,343,914 A | 8/1982 | Lee | |
| 6,172,126 B1 | 1/2001 | Mueller et al. | |
| 6,579,517 B1 | 6/2003 | Kim et al. | |
| 6,794,445 B2 | 9/2004 | Reusmann et al. | |
| 6,893,683 B1 * | 5/2005 | Hesselmans | C09J 175/02 |
| | | | 427/385.5 |
| 7,160,974 B2 | 1/2007 | Peerlings et al. | |
| 9,404,019 B2 | 8/2016 | Muenter et al. | |
| 9,574,072 B2 | 2/2017 | Yun et al. | |
| 9,617,453 B2 | 4/2017 | Campbell et al. | |
| 2005/0003102 A1 | 1/2005 | Lockhart et al. | |
| 2005/0159575 A1 | 7/2005 | Rische et al. | |
| 2005/0222368 A1 | 10/2005 | Reiners et al. | |
| 2007/0112129 A1 | 5/2007 | Licht et al. | |
| 2009/0099082 A1 | 4/2009 | Schoenberger et al. | |
| 2009/0156704 A1 | 6/2009 | Stowell et al. | |
| 2009/0214651 A1 | 8/2009 | Fugmann et al. | |
| 2010/0098867 A1 | 4/2010 | Costa et al. | |
| 2011/0171277 A1 | 7/2011 | Schoenberger | |
| 2014/0215850 A1 | 8/2014 | Redl et al. | |
| 2014/0275411 A1 | 9/2014 | Wright | |
| 2015/0079406 A1 | 3/2015 | Tennebroek et al. | |
| 2015/0354133 A1 | 12/2015 | Yan et al. | |
| 2017/0190827 A1 | 7/2017 | Plaver | |
| 2017/0306122 A1 | 10/2017 | Meyer-Ahrens et al. | |
| 2021/0261717 A1 | 8/2021 | Janssen | |
| 2021/0269578 A1 | 9/2021 | Derksen et al. | |
| 2021/0269669 A1 | 9/2021 | Derksen | |

FOREIGN PATENT DOCUMENTS

| | | |
|---|---|---|
| CN | 103819648 A | 5/2014 |
| CN | 105297462 A | 2/2016 |
| CN | 104004159 B | 4/2016 |
| CN | 106496486 A | 3/2017 |
| CN | 107794775 A | 3/2018 |
| CN | 107814907 A | 3/2018 |
| DE | 102015116528 A1 | 3/2017 |
| EP | 0510743 B1 | 8/1999 |
| EP | 1153051 B1 | 12/2004 |
| EP | 1717257 A1 | 11/2006 |
| EP | 1233991 B1 | 7/2008 |
| EP | 2066712 B1 | 1/2010 |
| EP | 1785439 B1 | 3/2010 |
| EP | 2690117 A1 | 1/2014 |
| EP | 3205679 A1 | 8/2017 |
| JP | 3047098 B2 | 5/2000 |
| JP | 2013011040 A | 1/2013 |
| JP | 2015131922 A | 7/2015 |
| KR | 101565376 B1 | 11/2015 |
| KR | 20170119141 A | 10/2017 |
| WO | 2001023451 A2 | 4/2001 |
| WO | 2020111944 A1 | 6/2020 |
| WO | 2020111945 A1 | 6/2020 |

(Continued)

OTHER PUBLICATIONS

Office Action of Japan application 2021-529753 Ref. No. F81490A1 Mailing No. 130457 Mailing Date: Mar. 18, 2024.

(Continued)

*Primary Examiner* — Jeremy R Pierce
(74) *Attorney, Agent, or Firm* — Verrill Dana, LLP

(57) ABSTRACT

An embodiment of the present invention relates to a composite structure with one or several polyurethane layers, which is substantially free of volatile organic compounds (VOC). In addition, the invention relates to the method of manufacturing such composite structure. Further, the invention relates to the use of such composite structure, in particular as artificial leather.

22 Claims, No Drawings

(56) References Cited

FOREIGN PATENT DOCUMENTS

| | | |
|---|---|---|
| WO | 2020130808 A1 | 6/2020 |
| WO | 2020130831 A1 | 6/2020 |

OTHER PUBLICATIONS

"Database WPI Week 201736", Thomspon Scientific, London, GB, AN 2017-191891 XP002792825 & CN 106496486, (2017).

* cited by examiner

COMPOSITE STRUCTURE WITH POLYURETHANE LAYERS, WHICH IS SUBSTANTIALLY FREE OF VOLATILE ORGANIC COMPOUNDS

CROSS-REFERENCE TO RELATED APPLICATIONS

This application is a continuation-in-part application of International Patent Application No. PCT/NL2019/050793, entitled "COMPOSITE STRUCTURE WITH POLYURETHANE LAYERS, WHICH IS SUBSTANTIALLY FREE OF VOLATILE ORGANIC COMPOUNDS", filed on Nov. 29, 2019, which claims priority to Netherlands Application No. 2022103, filed on Nov. 30, 2018, and the specification and claims thereof are incorporated herein by reference.

BACKGROUND OF THE INVENTION

Field of the Invention

One embodiment of the present invention relates to a composite structure with two or more polyurethane layers, which is substantially free of volatile organic compounds (VOC). In addition, the invention relates to a method of manufacturing such composite structure. Further, embodiments of the present invention relates to the use of such composite structure, in particular as artificial leather.

A composite structure is a structure made from two or more constituent materials with significantly different physical or chemical properties that, when combined, produce a material with characteristics different from the individual components and often properties of the composite structures are superior to those of the individual components. The individual components remain separate and distinct within the finished structure, differentiating composites from mixtures and solid solutions. An important example of a composite structure is artificial leather, which is also called imitation leather or synthetic leather. Artificial leather is used as a substitute for leather in fields such as upholstery, clothing, footwear and other uses where a leather-like finish is required but the actual material is cost-prohibitive or unsuitable. Artificial leather is a flexible composite material that typically consists of several layers, with the top layer being a polymer layer to protect against abrasion and impact and that determines the visual appearance and with a support layer typically being a textile, or a material like PVC, polyolefin or polyurethane and that provides the mechanical strength to the artificial leather. Artificial leather provides an economic and multi-functional way to replace natural leather. Artificial leather comprising a polyurethane layer on a substrate such as a woven fabric or non-woven fabric has been used widely for many years. Such artificial leather is required to be qualified in stain resistance, water resistance, flexibility, abrasion resistance and non-tackiness, and it is also often required to have a low coefficient of surface friction.

Background Art

Hitherto, in the manufacturing of artificial leather, components have been used that either contain solvents, co-solvents or other volatile organic components. A method to obtain artificial leather that is free of VOC is post-treating the artificial leather by prolonged ageing at elevated temperatures, such as described in KR 101565376. Another method to pass a test on release of VOC is to add absorbents to the various layers constituting the artificial leather, such as described in CN 107794775, or to add VOC-inhibiting particles to the various layers constituting the artificial leather, such as described in CN 105297462. Another method to obtain an artificial leather with low VOC is by applying blocked high solids resins, such as in U.S. Pat. No. 9,574,072, but there is still the issue that the blocking agent may remain partly trapped inside the coating during the curing steps, so that the resulting artificial leather still contains an amount of the blocking agents, and thus still contains an amount of VOC.

US 2015/354133 relates to synthetic leather having low VOC levels and describes a multilayer structure containing (a) a fabric, (b) a polyurethane foam derived from an aqueous polyurethane dispersion containing a surfactant and (c) a skin layer containing a wetting agent and an acrylic polymer and optionally a polyurethane dispersion. An additional finishing layer to provide abrasion resistance can be provided on top of the skin layer. The aqueous based process for manufacturing said multilayer structure involves providing a polyurethane foam coated on a fabric, attaching the foam to a release paper with the skin layer therebetween, and removing the release paper.

KR 2017/0119141 also relates to synthetic leather having low VOC levels and describes a three-layer structure containing a water-dispersed polyurethane as a skin layer and a solvent-free two-component polyurethane as an adhesive layer. The solvent-free polyurethane dispersions of the skin layer however do contain volatile amines as bases. The manufacturing process involves applying the polyurethane aqueous dispersion onto a release paper and drying it to form the skin layer, and then to apply the two-component solventless polyurethane adhesive onto the surface of said skin layer and drying, followed by laminating the base layer onto the adhesive layer and ultimately removing the release paper.

BRIEF SUMMARY OF THE INVENTION

The presence of VOC in artificial leather is undesired, because release of this VOC during the lifetime of the artificial leather may expose humans to VOC, which may cause headaches, nausea, fatigue etc. especially when the artificial leather is used in a confined space like an automotive interior. In addition, several countries have legislations that limit the amount of VOC that a company may release during a period of time, which further motivates to reduce the amount of VOC.

It is therefore an aim of an embodiment of the present invention to provide composite structures containing one or more layers based on polyurethane which can be used as artificial leather with zero or very low VOC levels without having to add special ingredients or without having to post-treat the composites after manufacture and without deterioration of any other property of the composites. It is yet another object of an embodiment of the invention is to provide a suitable method for manufacturing the composite structures.

This aim is achieved by using in each of the constituting layers of the composite, resins and polymer mixtures that by itself do not contain VOC. Hence no VOC is released during the manufacture and use of the composite structure and at the same time the obtained composite structure maintains all of its other properties at a satisfactory level. A further aspect of an embodiment of the present invention is to provide an embodiment of a composite structure wherein no VOC is released or substantially no VOC is released in the manufacture and use of the composite structure.

Accordingly one embodiment of the present invention provides a composite structure substantially free of VOC and comprising three or more layers of which at least two layers are based on polyurethane, said layers being
1) a support layer;
2) an adhesive layer based on a polyurethane dispersion;
3) a skin layer based on polyurethane;
4) optionally a pre-skin layer based on a polyurethane, which may be a polyurethane dispersion; and
5) optionally a lacquer layer based on a polyurethane dispersion and/or a polyacrylate dispersion;
wherein each of said layers are formed from a composition substantially free of volatile organic compounds.

In the context of an embodiment of the present invention, the term VOC is meant to refer to organic chemical compounds which can quickly evaporate into air due to their high vapour pressure and low boiling point, as VOC is considered any organic compound having an initial boiling point less than or equal to 250° C. measured at a standard pressure of 101.3 kPa, which follows the European Directive 2004/42/EC. As VOC's which are customarily used in processes for making such composite structures various solvents, co-solvents and volatile amines can be listed such as acetone, methyl ethyl ketone, dipropylene glycol dimethyl ether, 1-ethyl-2-pyrrolidon, 1-methyl-2-pyrrolidon, trimethylamine, N,N-dimethylethanolamine, N,N-diethylethanolamine, 4-ethylmorpholine.

In the context of an embodiment of the present invention, the term composition substantially free of VOC, means that the amount of VOC in the composition used to make each of the layers of the composite structure is less than about 1000 ppm, preferably below about 500 ppm and more preferably below about 200 ppm. In the context of an embodiment of the present invention, the meaning of composite structure substantially free of VOC means that the total amount of VOC in the composite structure is less than about 100 ppm, preferably below about 50 ppm and more preferably below about 30 ppm, as measured according to the VDA-277 method, wherein the total amount of VOC has been recalculated as acetone equivalent and that the total amount of VOC in the composite structure is less than about 500 ppm, preferably below about 400 ppm and more preferably below about 300 ppm, as measured according to the VDA-278 method, wherein the total amount of VOC has been recalculated as toluene equivalent. The recalculation to acetone equivalent and to toluene equivalent is done to be able to report the total VOC in one summarized number, wherein the other components are treated as if the intensity of their response in the measurement would be the same as that of acetone and toluene, respectively. This is done in these methods because it is not feasible to measure calibration curves of all components that are being detected, so the calibration curve of acetone, respectively toluene, is used for deriving the amounts of the other components. These are then all summed together into one value per measurement.

The major advantage of an embodiment of the present invention is that the composite structure of an embodiment of the present invention is substantially free of VOC, without prolonged ageing being required to eliminate residual VOC and without adsorbents needed to absorb VOC in order to achieve artificial leather that is substantially free of VOC.

The composite structure of an embodiment of the present invention is not only substantially free of VOC but also has a low content of condensable substances (FOG value) as determined according to VDA 278 method, wherein the detectable FOG range is for substances in the boiling/elution range from tetradecane (C14) to dotriacontane (C32). This is another advantage of an embodiment of the present invention.

In the context of an embodiment of the present invention, the term polyurethane is meant to include next to polyurethane, also polyurea, polyisocyanurate, isocyanurate-modified polyurethane and other derivates such as polyurethanes modified by carbodiimide, allophonate, biuret, uretonimine, etc.

The support layer of the present composite structure is preferably a textile support layer, or a support layer made of PVC, polyolefin or polyurethane foam.

The adhesive layer of the present composite structure is based on a polyurethane dispersion that is substantially free from solvents (besides water), in particular volatile solvents and substantially free from volatile amines.

The skin layer of the present composite structure is based on a polyurethane composition that is substantially free from (volatile) solvents. In a preferred embodiment of the present invention the skin layer is not based on a polyurethane dispersion. In a preferred embodiment of the present invention said polyurethane skin layer is based on a low-solvent or solvent-free polyurethane formulation containing a polyisocyanate functional polyurethane prepolymer and a compound containing reactive hydrogen which is a solid material and optionally a foaming agent, which reactive hydrogen-containing compound is preferably a polyhydrazide, a polysemicarbazide, a polysulfonylhydrazide or carbodihydrazide, wherein the compound containing reactive hydrogen is both ground and dispersed in a material which is non-reactive towards the compound containing reactive hydrogen. Said polyisocyanate functional polyurethane prepolymer and said compound containing reactive hydrogen are present in said formulation preferably in a stoichiometric ratio of about 0.5 to about 1.5, more preferably in a ratio of about 0.9 to about 1.1. Said formulation is stable at ambient temperature for at least one day, and is applied as a layer at ambient temperature, followed by reacting the above compounds at about 80 to about 200° C. for about 1 to about 10 minutes. Such low-solvent or solvent-free polyurethane compositions and processes for applying them to substrates are described in EP 1233991, incorporated herein by reference. The advantage of using a skin layer based on such a polyurethane composition over a skin layer based on a polyurethane dispersion is that said compositions can be applied in a higher thickness and that the dried thickness is essentially the same as the wet thickness. With polyurethane dispersions there is an upper limit on the layer thickness and the dried thickness is much smaller than the wet thickness. The skin layer of composites of an embodiment of the present invention generally has a thickness of between about 100 micron and about 400 micron which can be applied in one pass with the polyurethane compositions as described above. Should polyurethane dispersion be used in the skin layer then the maximum thickness obtained in a one pass coating of the skin layer would be about 150 micron of wet polyurethane dispersion, which would result in a dried thickness of about 50 to about 90 micron, depending on the solids level of the polyurethane dispersion and thus several coating passes would be required to obtain the envisaged skin layer thickness, which is laborious and adds more costs, if a total thickness of dried skin layer of about 200 to about 400 micron is desired, as such thicknesses are often required.

In a preferred embodiment of the present invention the skin layer is not based or does not contain an acrylic resin, particularly not as a main binder. Polyurethane is used instead of acrylic in the skin layer of the composite structure of an embodiment of the present invention. Advantages of polyurethane over acrylic resin is that polyurethane has a higher flexibility than acrylic resins, especially at low temperature, such as about −10° C. to about −30° C., and, in addition, a higher loading of fillers can be added into a polyurethane while still retaining sufficient flexibility.

The optional pre-skin layer of the present composite structure is based on a polyurethane, which may be a polyurethane dispersion that is substantially free from (volatile) solvents (besides water) and that is substantially free from volatile amines.

The optional lacquer layer of the present composite structure is based on a polyurethane dispersion and/or a polyacrylate dispersion that is substantially free from (volatile) solvents and that is substantially free from volatile amines and that may optionally contain matting agents, flow agents, haptic agents, pigments or dyes. The lacquer layer may contain a polyacrylate duller, a polyurethane duller, a silica duller, a silicone-based duller or a combination of any of these. The lacquer layer may also be crosslinked, e.g., with a polyisocyanate or a polycarbodiimide.

According to a second aspect of an embodiment of the present invention there is also provided a method of manufacturing the composite structures using components that are by itself already substantially free of VOC. A preferred method of manufacturing the present composite structures is by so-called reverse coating.

According to one embodiment this method comprises the steps of
a) coating a polyurethane, which may be a polyurethane dispersion that is substantially free from (volatile) solvents and that is substantially free from volatile amines, on a carrier, such as release paper, to a thickness of about 0.05 to about 0.15 mm to form a pre-skin layer upon drying;
b) coating the pre-skin layer with a polyurethane layer that is substantially free from (volatile) solvents and that is preferably made according to the process described in EP1233991 in a thickness of about 0.1 to about 0.4 mm, and then heat curing thereof at a temperature of about 150 to about 170° C. to form the skin layer;
c) coating an adhesive, which is a polyurethane dispersion that is substantially free from (volatile) solvents and that is substantially free from volatile amines, on the skin layer to a thickness of about 0.01 to about 0.15 mm, and then adhering a support e.g. a fabric thereon, followed by drying at about 60 to about 90° C. and curing at about 100 to about 130° C.;
d) peeling off the carrier; and
e) optionally applying on top of the pre-skin layer and then drying a lacquer layer wherein the lacquer layer is made from a polyurethane dispersion and/or a polyacrylate dispersion that is substantially free from (volatile) solvents and that is substantially free from volatile amines and that may optionally also contain matting agents, flow agents, haptic agents, pigments or dyes.

In another embodiment the method comprises the steps of
a) coating a carrier, such as release paper, with a polyurethane layer that is substantially free from (volatile) solvents and that is preferably made according to the process described in EP1233991 in a thickness of about 0.1 to about 0.4 mm, and then heat curing thereof at a temperature of about 150 to about 170° C. to form the skin layer;
b) coating an adhesive, which is a polyurethane dispersion that is substantially free from (volatile) solvents and that is substantially free from volatile amines, on the skin layer to a thickness of about 0.01 to about 0.15 mm, and then adhering a support e.g. a fabric thereon, followed by drying at about 60 to about 90° C. and curing at about 100 to about 130° C.;
c) peeling off the carrier; and
d) optionally applying on top of the skin layer and then drying a lacquer layer wherein the lacquer layer is made from a polyurethane dispersion and/or a polyacrylate dispersion that is substantially free from (volatile) solvents and that is substantially free from volatile amines and that may optionally also contain matting agents, flow agents, haptic agents, pigments or dyes.

It is an essential part of the construction of the composite structure according to an embodiment of the present invention that the polyurethane dispersion that is used in the adhesion layer and optional pre-skin layer and optional lacquer layer is substantially free of (volatile) organic solvent, substantially free of volatile amine and substantially free of any other VOC.

Polyurethane dispersions are generally made by dispersing a polyurethane prepolymer into water. Suitable prepolymers may be made by reacting isocyanate components with polyols.

Preferred prepolymers may be made with aliphatic di-isocyanates, aromatic di-isocyanates, or a mixture of aromatic and aliphatic di-isocyanates, such as toluene-2,4-diisocyanate, toluene-2,6-diisocyanate and mixtures thereof, diphenylmethane-4,4-diisocyanate, 1,4-phenylenediisocyanate, dicyclohexyl-methane-4,4'-diisocyanate, 3-isocyanatomethyl-3,5,5-trimethylcyclo-hexylisocyanate, 1,6-hexyldi-isocyanate, 1,5-pentyldiisocyanate, 1,3-bis (isocyanatomethyl)cyclohexane, 2,2,4-trimethyl-1,6-diisocyanatohexane (2,2,4-isomer, 2,4,4-isomer, or mixture thereof), 1,4-cyclohexyldiisocyanate, norbonyldiisocyanate, p-xylylene diisocyanate, 2,4'-diphenylmethane diisocyanate, and/or 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues. Particularly preferred polyisocyanates are aliphatic polyisocyanates including 3-isocyanatomethyl-3,5, 5-trimethylcyclohexyl isocyanate, hexamethylene diisocyanate and dicyclohexyl-methane-4,4'-diisocyanate.

Polymeric polyols having molecular weights in the range of about 500 to about 6000 which may be used in the preparation of the prepolymer particularly include diols and triols and mixtures thereof but higher functionality polyols may be used as well, for example as minor components in admixture with diols. The polyols may be members of any of the chemical classes of polymeric polyols used or proposed to be used in polyurethane formulations. Preferred polyols are selected from the group of polyester polyols, polyesteramide polyols, polyether polyols, polythioether polyols, polycarbonate polyols, polyacetal polyols, polyolefin polyols or polysiloxane polyols or mixtures thereof. Preferred polyol molecular weights are from about 700 to about 4000. Polyols having molecular weights below about 500 which may optionally be used in the preparation of the prepolymer particularly include diols and triols and mixtures thereof but higher functionality polyols may be used. Examples of such lower molecular weight polyols include ethylene glycol, diethylene glycol, triethylene glycol, tetraethylene glycol, bis (hydroxyethyl) terephthalate, neopentylglycol, trimethylol propane, cyclohexane dimethanol, furan dimethanol, glycerol and the reaction products, up to molecular weight about 499, of such polyols with propylene oxide and/or ethylene oxide.

Dispersibility of the polyurethane prepolymers in water can be achieved by incorporating hydrophilic groups into the prepolymer. For this reason other polyols are generally present during the prepolymer formation such as a polyethoxy diol, a poly(ethoxy/propoxy) diol, a diol containing a pendant ethoxy or (ethoxy/propoxy) chain, a diol containing a carboxylic acid, a diol containing a sulfonic group, a diol containing a phosphate group, a polyethoxy mono-ol, a poly(ethoxy/propoxy) mono-ol, a mono-ol containing a pendant ethoxy or (ethoxy/propoxy) chain, a mono-ol containing a carboxylic acid or a sulfonic acid or salt, or mixtures thereof. A diol containing a carboxylic acid include carboxyl group containing diols and triols, for example dihydroxy alkanoic acids of the formula: R—C—(CH$_2$—OH)$_2$—COOH wherein R is hydrogen or alkyl. Examples of such carboxyl containing diols are 2,2-dimethylolpropionic acid and 2,2-dimethylolbutanoic acid. Other useful acid group containing compounds include amino carboxylic acids, for example lysine, cysteine and 3,5-diaminobenzoic acid and sulfonic acids, for example 4,6-diaminobenzene-1,3-disulfonic acid.

The carboxylic acid functions are generally neutralized with a neutralizing agent, such as a mineral base or a non-volatile tertiary amine, before or during dispersion of the polyurethane prepolymer into water. Both the polyurethane prepolymer and the tertiary amine functional urethane prepolymer or oligomer or dispersion thereof may contain additional functional groups with the objective to improve the water dispersibility, to improve adhesion to substrates during application, for performance reasons, or as potential sites for crosslinking. Suitable functions are polyalkoxy functions with a large concentration of ethoxy functions, tertiary amine or quaternary amine functions, perfluoro functions, incorporated silicon functions, hydrazide functions or hydrazone functions, ketone, acetoacetate, or aldehyde functions, or mixtures thereof.

The conversion of any acid groups present in the prepolymer to anionic groups may be affected by neutralising the said acidic groups before, after or simultaneously with formation of the aqueous dispersion. Suitable neutralising agents include sodium hydroxide, potassium hydroxide, lithium hydroxide or tertiary amines such as N-butyldiethanolamine, N,N-bis[3-(dimethylamino)propyl]-N',N'-dimethylpropane-1,3-diamine.

Polyurethane prepolymers useful in the practice of an embodiment of the present invention may be prepared in conventional manner by reacting a stoichiometric excess of the organic polyisocyanate with the polymeric polyol having a molecular weight in the range about 500 to about 6000 and the other required isocyanate-reactive compounds under substantially anhydrous conditions at a temperature between about 30° C. and about 130° C. until reaction between the isocyanate groups and the hydroxyl groups is substantially complete. The polyisocyanate and the active hydrogen containing components are suitably reacted in such proportions that the ratio of number of isocyanate groups to the number of hydroxyl groups is in the range from about 1.1:1 to about 6:1, preferably within the range of from about 1.5:1 to about 3:1. If desired, catalysts, such as bismuth carboxylate, zinc carboxylate, dibutyltin dilaurate, aluminium chelate, zirconium chelate, stannous octoate or triethylenediamine, may be used to assist prepolymer formation.

Prepolymers useful in the practice of an embodiment of the present invention should be substantially liquid under the conditions of the dispersing step, which means that these prepolymers should have a viscosity below about 100,000 mPa·s at a temperature of about 90° C., measured using a Brookfield LVF Viscometer.

The polyurethane dispersions used in an embodiment of the present invention include generally an extension agent, which is used to build the molecular weight of the polyurethane prepolymer by reacting the extension agent with the isocyanates functionality of the polyurethane prepolymer. The active hydrogen containing extension agent which is reacted with the prepolymer is suitably a polyol, an amino alcohol, ammonia, a primary or secondary aliphatic, alicyclic, aromatic, araliphatic or heterocyclic amine especially a diamine, hydrazine or a substituted hydrazine. Water-soluble extension agents are preferred, and water itself may be effective. Examples of suitable extension agents useful herein include ethylene diamine, diethylene triamine, triethylene tetramine, propylene diamine, butylene diamine, hexamethylene diamine, cyclohexylene diamine, piperazine, 2-methyl piperazine, phenylene diamine, bis(3-aminopropylamine), sodium 2-[(2-aminoethyl)amino]ethanesulfonate, tolylene diamine, xylylene diamine, tris (2-aminoethyl) amine, 3,3'-dinitrobenzidine, 4,4'methylenebis (2-chloraniline), 3,3'-dichloro-4,4'-bi-phenyl diamine, 2,6-diaminopyridine, 4,4'-diaminodiphenylmethane, menthane diamine, m-xylene diamine, 5-amino-1,3,3-trimethyl-cyclohexanemethyl-amine, amine terminated polyethers such as, for example, Jeffamine D-230 from Huntsman Chemical Company, and adducts of diethylene triamine with acrylate or its hydrolyzed products. Also suitable are materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids, adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semicarbazide, bis-hydrazide carbonic esters of glycols such as any of the glycols mentioned above. The amount of extension agent employed should be approximately equivalent to the free-NCO groups in the prepolymer, the ratio of active hydrogens in the chain extender to NCO groups in the prepolymer preferably being in the range from about 0.7:1 to about 2.0:1. Of course when water is employed as the extension agent, these ratios will not be applicable since the water, functioning both as extension agent and dispersing medium, will be present in a gross excess relative to the free-NCO groups.

While polyurethane prepolymers may retain some isocyanate reactivity for some period of time after dispersion, for purposes of an embodiment of the present invention, a polyurethane prepolymer dispersion is considered to be a fully reacted polyurethane polymer dispersion. Also, for purposes of an embodiment of the present invention, a polyurethane prepolymer or polyurethane polymer can include other types of structures such as, for example, urea groups.

The aqueous polyurethane dispersion comprises at least about 30 wt %, preferably at least about 40 wt %, more preferably at least about 55 wt % of polyurethane polymer particles based on total mass of the dispersion. As conventionally done by the skilled person, the weight percentage is calculated beforehand, taking into account which components evaporate and which components do not evaporate. The solids percentage is at a later stage measured to confirm:

thereto, a small amount is weighted, then put in an oven at about 105° C. during one hour and the remaining amount is measured. In this control step, a higher or longer temperature/time regime can be chosen as well, if there are slowly evaporating components present.

If desired, amounts of emulsifiers, defoamers, flame retardants, thickeners, stabilizers, anti-oxidants and/or anti-settling agents may be included in the prepolymer or the water phase, or may be added to the aqueous polyurethane dispersion.

The prepolymer thus prepared and a water phase are being mixed to obtain a polyurethane dispersion, wherein the extension agent, if the extension agent is different from water, can be added to the water phase prior to the dispersing step, or can be added during the dispersing step, or can be added to the dispersion after the dispersing step. Optionally, neutralization agents, undiluted or with water diluted additives, like emulsifiers, defoamers, flame retardants, thickeners, stabilizers, anti-oxidants and/or anti-settling agents can be added to the water phase or to the dispersion.

The viscosity of the aqueous polyurethane dispersion is generally lower than about 1000 mPa·s, preferably lower than about 750, more preferably lower than about 500, and most preferably lower than about 250 mPa·s, as measured at about 25° C. using a Brookfield LVF Viscometer.

A particularly preferred process for the preparation of a polyurethane dispersion substantially free from volatile organic compounds for use in the composite structure of an embodiment of the present invention comprises the steps of:
i) synthesizing, in the substantial absence of acetone or other (volatile) solvents, a polyurethane prepolymer from isocyanates, polyols, that generally include polyols with hydrophilic groups, and a component A, said component A having x hydroxyl groups and y amine groups, wherein both x and y independently can be 0 or more than 0 and wherein x+y≥2, and having an additional functional group that is capable of forming a salt such as a carboxylate, sulfonate or phosphate group; and
ii) dispersing the obtained prepolymer into a water phase comprising water, one or more neutralizing agents, such as alkaline metal hydroxide, and optionally an emulsifier, and forming polyurethane by reacting with one or more extension agents comprising a component B, said component B having x hydroxyl groups and y amine groups, wherein both x and y independently can be 0 or more than 0 and wherein x+y≥2, and having an additional functional group that is capable of forming a salt such as a carboxylate, sulfonate or phosphate group, such that the dispersion of the polyurethane has a solids content of at least 50 weight percent and is substantially free from acetone or other (volatile) solvents and is substantially free from amines or other volatile compounds that have a boiling point of below about 250° C.

In a third aspect, an embodiment of the present invention relates to the use of such composite structure, in particular as artificial leather.

The thickness of the composite structure of an embodiment of the present invention is generally between about 0.8 and about 1.2 mm with the thickness of the support layer generally being about 500 to about 1000 micron. Remaining thickness comes from the coating layers of which the skin layer is generally the thickest. The thickness of the various coating layers in the composite structure of the embodiment of the present invention is generally within the following ranges: for the adhesive layer about 30 to about 60 micron, for the skin layer about 100 to about 400 micron, for the optional pre-skin layer about 10 to about 60 micron and for the optional lacquer layer about 5 to about 20 micron.

The above-described specific embodiments are all embodiments in accordance with an embodiment of the present invention. The various embodiments may be mutually combined. A feature described for one particular embodiment may be taken up, incorporated in or otherwise combined with other particular embodiments unless the laws of physics would forbid such combinations.

One or more embodiment of the present invention will be further elaborated by the following non-limiting working examples. Parts and percentages of components referred to in these working examples are drawn to the weight of the total composition wherein these components are present, like in the other parts of the description and claims, unless otherwise indicated.

EXAMPLES

Example 1: Preparation of Polyurethane Dispersion

Under a nitrogen atmosphere a mixture of 415 g of a poly(tetramethylene ether) glycol with a molecular weight of 2000, 57 g of a polycarbonate diol, derived from hexanediol, with a molecular weight of 1000 and 4 g of dimethylolpropanoic acid were heated to 50° C. while stirring. 70 g of 3-isocyanatomethyl-3,5,5-trimethylcyclohexylisocyanate and 25 g of hexamethylene diisocyanate were added and the mixture was heated to 85° C. and stirred for 1.5 hours to form a polyurethane prepolymer. The reaction was cooled down and the amount of remaining NCO was measured. The prepolymer was dispersed into a water phase consisting of 390 g of water, 15 g of Synperonic PE/L62 (an emulsifier from Croda), 1.2 g of potassium hydroxide and 13 g of Vestamin A95 (a solution of sodium 2-[(2-aminoethyl)amino]ethanesulfonate from Evonik). Subsequently, 8 g of hydrazine hydrate was added and the dispersion was stirred for 15 minutes. The solids content of the dispersion was 60%. The viscosity of the dispersion was 200 mPa·s, as measured at 25° C. using a Brookfield LVF Viscometer.

Example 2: Preparation of Polyurethane Dispersion

Under a nitrogen atmosphere a mixture of 205 g of a polycarbonate diol, derived from pentane diol and hexane diol, with a molecular weight of 2000, 205 g of a polycarbonate diol, derived from hexanediol, with a molecular weight of 1000, 4 g of dimethylolpropanoic acid and 14 g of Ymer-120 (a linear difunctional polyethylene glycol monomethyl ether from Perstorp) were heated to 50° C. while stirring. 115 g of 3-isocyanatomethyl-3,5,5-trimethyl-cyclohexylisocyanate and 30 g of hexamethylene diisocyanate were added and the mixture was heated to 85° C. and stirred for 1.5 hours to form a polyurethane prepolymer. The reaction was cooled down and the amount of remaining NCO was measured. The prepolymer was dispersed into a water phase consisting of 390 g of water, 15 g of Synperonic PE/L62 (an emulsifier from Croda), 1.8 g of potassium hydroxide, 6 g of Vestamin A95 (a solution of sodium 2-[(2-aminoethyl)amino]ethanesulfonate from Evonik) and 3 g of hydrazine hydrate. Subsequently, 13 g of hydrazine hydrate was added and the dispersion was stirred for 15 minutes. The solids content of the dispersion was 60%. The viscosity of the dispersion was 200 mPa·s, as measured at 25° C. using a Brookfield LVF Viscometer.

Example 3: Preparation of Polyurethane Dispersion

Under a nitrogen atmosphere a mixture of 495 g of a polypropylene glycol with a molecular weight of 4000 and 10 g of dimethylolpropanoic acid were heated to 50° C. while stirring. 85 g of dicyclohexyl-methane-4,4'-diisocyanate was added and the mixture was heated to 110° C. and stirred for 2.5 hours to form a polyurethane prepolymer. The reaction was cooled down and the amount of remaining NCO was measured. The prepolymer was dispersed into a water phase consisting of 395 g of water, 2.5 g of Marlipal O13/90 (an emulsifier from Sasol) and 1.5 g of potassium hydroxide. Subsequently, 6 g of hydrazine hydrate was added and the dispersion was stirred for 15 minutes. The solids content of the dispersion was 60%. The viscosity of the dispersion was 100 mPa·s, as measured at 25° C. using a Brookfield LVF Viscometer.

Example 4: Preparation of a Lacquer Composition

To 386 g of RH-22-067 (an aqueous polyurethane/polyacrylic dispersion from Stahl Europe) is added, while stirring, 1 g of BYK-035 (a defoamer from BYK), 175 g of Daiplacoat Clear (a polyurethane matting agent from Dainichiseika Color & Chemicals), 16 g of Rheolate HX 6008 (a thickener from Elementis), 412 g of water, 5 g of Tego Airex 902W (a deaerator emulsion from Evonik) and 4 g of Dow Corning 501W Additive (a wetting agent from Dow Corning).

Example 5: Preparation of a Lacquer Composition

To 196 g of Example 2 is added, while stirring, 600 g of water, 1 g of BYK-035 (a defoamer from BYK), 175 g of Daiplacoat Clear (a polyurethane matting agent from Dainichiseika Color & Chemicals), 17 g of Rheolate HX 6008 (a thickener from Elementis), 5 g of Tego Airex 902W (a deaerator emulsion from Evonik) and 4 g of Dow Corning 501W Additive (a wetting agent from Dow Corning).

Example 9: Preparation of Composite Structure a) Applying a mixture of 50 parts of the polyurethane dispersion of Example 1, 50 parts of the polyurethane dispersion of Example 2, 10 parts of PP-39-611 (a black pigment paste from Stahl Europe by) and 2 parts of Rheolate HX 6008 (a thickener from Elementis) on release paper (UC Rockport #R028) with thickness of 0.1 mm to form a pre-skin layer upon drying for 2 minutes in an oven at 80° C.; b) coating the pre-skin layer with a mixture of 100 parts PermaQure HS-2798 (from Stahl Europe by), 9 parts of PermaQure XR-2303 (from Stahl Europe by) and 5 parts of GP-16-249 (which is a black pigment paste from Stahl Europe by) in a thickness of 0.3 mm, and then heat curing thereof for 2 minutes in an oven at a 165° C. to form the skin layer; c) coating the adhesive, which is a mixture of 40 parts of the polyurethane dispersion of Example 3 and 1 part of XR-92-210 (an isocyanate crosslinker from Stahl Europe by), on the skin layer to a thickness of 0.1 mm, and then adhering a textile (PES/CO #480) thereon, followed by drying for 2 minutes at 80° C. and curing for 2 minutes at 120° C.; d) peeling off the release paper; and e) applying a lacquer layer, which is the mixture of 100 parts of Example 4, 3 parts of XR-92-910, 4 parts of Rheolate HX 6008, 8 parts of HM-54-006 and 2 parts of HM-2186 (both from Stahl Europe by) in a thickness of 0.02, followed by drying for 1 minutes at 80° C. and curing for 2 minutes at 120° C.

Examples 10-20: Preparation of Composite Structure

The procedure of Example 9 was followed, but other components were used for the pre-skin, the skin and the lacquer, as indicated in Table 1. In those examples where the pre-skin is indicated to be made only with Example 2, the mixture for the pre-skin was 100 parts of the polyurethane dispersion of Example 2, 10 parts of PP-39-611 and 2 parts of Rheolate HX 6008. In those examples where the skin is indicated to be made with HS-2798/HS-13-030, the mixture for the skin was 33 parts PermaQure HS-2798, 67 parts PermaQure HS-13-030 (from Stahl Europe by), 13 parts of PermaQure XR-2303 and 5 parts of GP-16-249. In those examples where the lacquer is indicated to be made with crosslinker XR-13-554, the mixture of the lacquer was 100 parts of Example 4, 3.5 parts of XR-13-554 (a polycarbodiimide crosslinker from Stahl Europe by), 4 parts of Rheolate HX 6008, 8 parts of HM-54-006 and 2 parts of HM-2186.

The table also mentions, for clarification, the composition of Example 9. The table also mentions a Comparative Example, which is made with RU-92-299 (a polyurethane dispersion from Stahl Europe by, which contains a volatile amine) as adhesive, a mixture of RU-92-299 and RU-92-605 (a polyurethane dispersion from Stahl Europe by, which contains a volatile amine) as pre-skin and WF-3649 (a lacquer mixture from Stahl Europe by, containing polyurethane dispersions, volatile amine and co-solvent) as lacquer.

TABLE 1

| Example | adhesive | Skin | preskin | Lacquer | Crosslinker |
| --- | --- | --- | --- | --- | --- |
| Comparative | RU-92-299 | HS-2798 | RU-92-299 + RU-92-605 | WF-3649 | none |
| 9 | Example 3 | HS-2798 | Example 1 + Example 2 | Example 4 | XR-92-910 |
| 10 | Example 3 | HS-13-030/HS-2729 | Example 1 + Example 2 | Example 4 | XR-92-910 |
| 11 | Example 3 | HS-2798 | Example 2 | Example 4 | XR-92-910 |
| 12 | Example 3 | HS-13-030/HS-2729 | Example 2 | Example 4 | XR-92-910 |
| 13 | Example 3 | HS-2798 | Example 1 + Example 2 | Example 4 | XR-13-554 |
| 14 | Example 3 | HS-13-030/HS-2729 | Example 1 + Example 2 | Example 4 | XR-13-554 |
| 15 | Example 3 | HS-2798 | Example 2 | Example 4 | XR-13-554 |
| 16 | Example 3 | HS-13-030/HS-2729 | Example 2 | Example 4 | XR-13-554 |
| 17 | Example 3 | HS-2798 | Example 1 + Example 2 | Example 5 | XR-92-910 |
| 18 | Example 3 | HS-13-030/HS-2729 | Example 1 + Example 2 | Example 5 | XR-92-910 |

TABLE 1-continued

| Example | adhesive | Skin | preskin | Lacquer | Crosslinker |
|---|---|---|---|---|---|
| 19 | Example 3 | HS-2798 | Example 2 | Example 5 | XR-92-910 |
| 20 | Example 3 | HS-13-030/ HS-2729 | Example 2 | Example 5 | XR-92-910 |

Examples 21-32: Preparation of Composite Structure

The procedure of Example 9 was followed, but other components were used for the pre-skin, the skin and the lacquer, as indicated in Table 2. In Examples 30 to 32 no lacquer was applied. In those examples where the pre-skin is indicated to be made with HS-13-030/HS-2729, the mixture for the pre-skin was 33 parts PermaQure HS-2729, 67 parts PermaQure HS-13-030, 13 parts of PermaQure XR-2303 (all from Stahl Europe by) and 5 parts of GP-16-249 (a black pigment paste from Stahl Europe by). In those examples where the pre-skin is indicated to be made with HS-13-030/HS-2729, the mixture for the pre-skin was 33 parts PermaQure HS-2729, 67 parts PermaQure HS-13-030, 13 parts of PermaQure XR-2303 and 5 parts of GP-16-249. In those examples where the skin is indicated to be made with HS-2798 Foamed, the mixture for the pre-skin was 100 parts PermaQure HS-2798, 9 parts of PermaQure XR-2303, 5 parts of GP-16-249, and 2 parts of MA-2738 (a foaming agent of Expancel type from Stahl Europe by). In those examples where the skin is indicated to be made with PermaQure HS-2729, the mixture for the skin was 67 parts PermaQure HS-13-030, 33 parts of PermaQure HS-2729, 13 parts of PermaQure XR-2303 and 5 parts of GP-16-196 (a white pigment paste from Stahl Europe by). As a result, Examples 23, 26, 29 and 32 were white in color, whereas all other Examples were black in color. In those examples where the lacquer is indicated to be made with crosslinker XR-13-554, the mixture of the lacquer was 100 parts of Example 4, 3.5 parts of XR-13-554, 4 parts of Rheolate HX 6008, 8 parts of HM-54-006 and 2 parts of HM-2186.

TABLE 2

| Example | adhesive | Skin | preskin | Lacquer | Crosslinker |
|---|---|---|---|---|---|
| 21 | Example 3 | HS-2798 | HS-13-030/ HS-2729 | Example 4 | XR-92-910 |
| 22 | Example 3 | HS-2798 foamed | HS-13-030/ HS-2729 | Example 4 | XR-92-910 |
| 23 | Example 3 | HS-13-030/ HS-2729 | none | Example 4 | XR-92-910 |
| 24 | Example 3 | HS-2798 | HS-13-030/ HS-2729 | Example 4 | XR-13-554 |
| 25 | Example 3 | HS-2798 foamed | HS-13-030/ HS-2729 | Example 4 | XR-13-554 |
| 26 | Example 3 | HS-13-030/ HS-2729 | none | Example 4 | XR-13-554 |
| 27 | Example 3 | HS-2798 | HS-13-030/ HS-2729 | Example 5 | XR-92-910 |
| 28 | Example 3 | HS-2798 foamed | HS-13-030/ HS-2729 | Example 5 | XR-92-910 |
| 29 | Example 3 | HS-13-030/ HS-2729 | none | Example 5 | XR-92-910 |
| 30 | Example 3 | HS-2798 | HS-13-030/ HS-2729 | none | none |
| 31 | Example 3 | HS-2798 foamed | HS-13-030/ HS-2729 | none | none |
| 32 | Example 3 | HS-13-030/ HS-2729 | none | none | none |

Example 33: Testing of Composite Structures

The composite structures made in Examples 9-32 and the Comparative Example were tested on several properties. The results are reported in Table 3. Gloss at 60° was measured with a Dr Lange reflectometer. Hot Xenon resistance was measured according to ISO 105-B06 option 3, 1-3-5 cycles, where the Delta E and the gloss shift are reported. The lowest Delta E and the lowest gloss shift are best. Hot Xenon resistance is important for surfaces exposed to much sun light, such as automobile dashboards and also for car seats. The Ballyflex resistance was measured according to ISO 32100, at room temperature for 100000 flexes, where the lowest score is the best, going from 5 to 0. Ballyflex resistance is important for surfaces that should be flexible, such as car seats and gaiters. Ballyflex resistance is not important for surfaces that do not have to be flexible, such as automobile dashboards. The Chemical Resistance is the numerical average of the scores obtained with dry rubs, and rub tests with water, isopropanol, ethanol and Essence F, which is a mixture of hydrocarbons and which is sold as a degreasing agent. The Chemical Resistance was measured according to ISO 105-X12. The number of rubs is 10 and the highest score is best, going from 1 to 5. Chemical Resistance is important for surfaces that come into contact with hands or cleaning, such as car seats and also gaiters. The gloss shift due to hydrolysis was done by comparing the gloss at 60° as described above for a fresh sample and the gloss at 60° after the sample had been subjected to hydrolysis conditions, according to DIN EN 20 105-A05, which is at temperature of 70° C., 90% relative humidity, for three weeks. The lowest gloss shift is best. Taber abrasion was measured according to ASTM D 3884, where 500 cycles were used, where the lowest score is best, going from 5 to 1. Abrasion resistance is important for surfaces that are exposed to wear, such as car seats. Stick-slip was measured according to VDA 230-206, where the lowest values are best, going from 10 to 1. Stick-slip performance is important for surfaces that can slide along each other, such as car seats.

TABLE 3

| | Gloss | Hot Xenon | | Ballyflex | Chemical | Hydrolysis | | Stickslip |
|---|---|---|---|---|---|---|---|---|
| Example | 60° | dE | Gloss shift | RT/100 k | Resistance | Gloss shift | Taber | VDA |
| Comparative | 0.6 | 0.9 | 0.6 | 0 | 4.0 | −0.1 | 3 | 2 |
| 9 | 0.9 | 1.06 | 0.8 | 1 | 3.0 | −0.2 | 4 | 2 |
| 10 | 0.9 | 0.52 | 0.0 | 0 | 3.0 | −0.1 | 4 | 1 |

TABLE 3-continued

| Example | Gloss 60° | Hot Xenon dE | Hot Xenon Gloss shift | Ballyflex RT/100 k | Chemical Resistance | Hydrolysis Gloss shift | Taber | Stickslip VDA |
|---|---|---|---|---|---|---|---|---|
| 11 | 0.9 | 0.32 | 0.4 | 4 | 3.0 | −0.1 | 4 | 2 |
| 12 | 1.0 | 0.65 | 0.0 | 4 | 3.0 | 0.1 | 4 | 2 |
| 13 | 0.9 | 1.43 | 1.2 | 0 | 4.2 | 0.0 | 1 | 2 |
| 14 | 0.9 | 0.30 | 0.2 | 0 | 4.2 | −0.1 | 1 | 2 |
| 15 | 0.9 | 0.48 | 0.3 | 4 | 3.7 | 0.0 | 2 | 2 |
| 16 | 0.9 | 0.37 | 0.1 | 4 | 3.7 | 0.0 | 4 | 2 |
| 17 | 1.0 | 0.40 | 0.1 | 0 | 3.9 | −0.1 | 3 | 2 |
| 18 | 1.0 | 0.28 | 0.2 | 0 | 3.5 | 0.0 | 3 | 1 |
| 19 | 1.1 | 0.35 | 0.0 | 4 | 4.0 | −0.1 | 4 | 2 |
| 20 | 0.9 | 0.32 | 0.1 | 5 | 3.9 | 0.0 | 4 | 2 |
| 21 | 0.8 | 1.25 | 1.2 | 0 | 3.6 | −0.1 | 4 | 1 |
| 22 | 0.8 | 1.41 | 2.6 | 1 | 3.6 | −0.1 | 4 | 2 |
| 23 | 2.5 | 2.14 | 0.7 | 0 | 4.4 | −0.1 | 3 | 1 |
| 24 | 0.9 | 1.71 | 2.2 | 0 | 4.0 | 0.0 | 3 | 2 |
| 25 | 0.9 | 1.66 | 3.3 | 0 | 4.2 | −0.1 | 2 | 2 |
| 26 | 2.5 | 2.48 | 0.7 | 0 | 4.6 | 0.0 | 3 | 2 |
| 27 | 0.9 | 0.54 | 2.0 | 0 | 3.7 | −0.2 | 3 | 2 |
| 28 | 0.9 | 0.90 | 1.5 | 0 | 3.7 | −0.2 | 2 | 2 |
| 29 | 2.6 | 1.82 | −0.1 | 0 | 4.4 | −0.1 | 3 | 2 |
| 30 | 1.6 | 0.69 | 3.2 | 0 | — | −0.2 | — | — |
| 31 | 1.5 | 0.79 | 6.2 | 0 | — | 0.1 | — | — |
| 32 | 3.1 | 2.34 | 2.5 | 0 | — | −0.1 | — | — |

Examples 10, 11, 12, 14, 15, 16, 17, 18, 19, 20, 27, 28, 30 and 31 scored well in the test for Delta E after Hot Xenon exposure, as did the Comparative Example. Examples 10, 11, 12, 14, 15, 16, 17, 18, 19, 20, 29 scored well in the test for gloss shift after Hot Xenon exposure, as did the Comparative Example. Examples 9, 10, 13, 14, 17, 18, 21, 22, 23, 24, 25, 26, 27, 28, 29, 30, 31 and 32 scored well in the Ballyflex test, as did the Comparative Example. Examples 13, 14, 17, 19, 20, 23, 24, 25, 26, 29 scored well in the Chemical resistance tests, as did the Comparative Example. All tested Examples scored well in the test for gloss shift after hydrolysis. Examples 13, 14, 15, 25, 28 scored well in the Taber test. All tested Examples scored well in the Stick-slip test.

Having in mind the importance of the various tests for the various surfaces, such as requirements for car seats, gaiters or automobile dashboards, the Examples 13, 14, 17, 25 and 29 are suitable for use on car seats as the results are good to satisfactory concerning Ballyflex, chemical resistances, Taber abrasion and stick-slip, and the Examples 10, 11, 12, 14, 15, 16, 17, 18, 19 and 20 are suitable for use on automobile dashboards as the results are good to satisfactory concerning Delta E and gloss shift after hot xenon exposure, and the Examples 13, 14, 17, 23, 24, 25 and 29 are suitable for use on gaiters as the results are good to satisfactory concerning Ballyflex and chemical resistances. This demonstrates that it is possible to obtain composite structures according to an embodiment of the present invention, that are substantially free of VOC while scoring well on test requirements for specific uses of such composite structures.

Example 34: Testing of Composite Structures on VOC

Several composite structures made in previous Examples were tested on presence of volatile components. The results are reported in Table 4.

The amount of total volatile organic compounds (TVOC) was measured according to the VDA 277 method with Headspace analysis. The apparatus used was an Interscience Trace 1300 Gas Chromatography Interscience ISQ (Single Quadrupole MS). The column was Restek Stabil Wax®-MS, 30 meter, 0.25 mmID, 0.25 µm df. The GC oven temperature program was: 3 minutes isothermal at 50° C., then heating to 200° C. at a rate of 12° C./minute, followed by 4 min isothermal at 200° C. The sample preparation was: 0.5 gram of the sample was cut in pieces between 10 mg and 25 mg and transferred into the Headspace vial. The samples were put in the Headspace oven for 5 hours at 120° C., and 1 ml of the vapor was injected into the GCMS. The samples were measured in duplicate. The mean TVOC value and main emission compounds (>1 µgC/g) are reported. The TVOC values were calculated as acetone equivalent.

The emission of volatile organic compound (VOC value) and the portion of condensable substances (s-VOC or FOG value) were determined by TD-GCMS according to VDA 278 method. The apparatus used were Markes TD100-xr automated thermal desorber, Interscience Trace 1300 Gas Chromatograph and Interscience ISQ QD (Single Quadrupole MS). The Column was Restek Rxi®-5Sil MS, 30 meter, 0.25 mmID, 0.50 µm df. The GC oven temperature program was, in case of the TVOC: 2 min isothermal at 40° C., heating to 92° C. at a rate of 3° C./minute, heating to 160° C. at a rate of 5° C./minute, heating to 280° C. at a rate of 10° C./minute, followed by 10 minutes isothermal at 280° C. The GC oven temperature program was, in case of the FOG: 2 minutes isothermal at 50° C., heating to 160° C. at a rate of 25° C./minute, heating to 280° C. at a rate of 10° C./minute, followed by 30 minutes isothermal at 280° C. The detectable VOC range was: Substances in the boiling/elution range up to Pentacosane (C25). The detectable FOG range was: Substances in the boiling/elution range from Tetradecane (C14) to Dotriacontane (C32). The sample preparation was: About 10 mg of sample was transferred into a glass desorption tube. The tubes were placed in the thermal desorber unit and desorbed 30 minutes at 90° C. for the VOC measurement and 60 minutes at 120° C. for the FOG measurement. The samples were measured in duplicate. The mean TVOC value and mean total FOG value are reported. TVOC values were calculated as toluene equivalent and TFOG values were calculated as Hexadecane equivalent.

TABLE 4

| Example | TVOC VDA 277 (μgC/g) 'Acetone' | VOC VDA 278 TVOC (μg/g) 'Toluene' | VOC VDA 278 TFOG (μg/g) 'Hexadecane' |
|---|---|---|---|
| Comparative | 78 | 721 | 424 |
| 9 | 8 | 203 | 87 |
| 13 | 22 | 159 | 49 |
| 17 | 9 | 210 | 51 |
| 30 | 6 | 194 | 4 |
| 31 | 8 | 105 | 4 |
| 32 | 9 | 314 | 37 |

The Examples 9, 13, 17, 30, 31 and 32 that have been measured for the presence of volatile compounds show a much lower amount of total VOC according to VDA 277, total VOC according to VDA 278 and total FOG according to VDA 278 than the Comparative Example. This demonstrates that the composite structures made according to an embodiment of the present invention indeed contain much lower amounts of volatile components, which is due to the use of components, that are substantially free from (volatile) solvents and that are substantially free from volatile amines, to make the layers of the composite structure.

Note that in the specification and claims, "about" or "approximately" means within twenty percent (20%) of the numerical amount cited. The singular forms "a", "an" and "the" are intended to include the plural forms as well, unless the context clearly indicates otherwise.

Although the invention has been described in detail with particular reference to these embodiments, other embodiments can achieve the same results. Variations and modifications of an embodiment of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A composite structure comprising three or more layers of which at least two layers are based on polyurethane, said layers being 1) a support layer, 2) an adhesive layer based on a polyurethane dispersion, and 3) a skin layer based on a polyurethane, wherein each of said layers are formed from compositions substantially free of volatile organic compounds, wherein the skin layer is not made from a polyurethane dispersion and has a dried thickness of between 100 microns and 400 microns, and wherein the adhesive layer is interposed between the skin layer and the support layer.

2. The composite structure of claim 1 further comprising at least one of 4) a pre-skin layer based on a polyurethane or a polyurethane dispersion, 5) a lacquer layer based on a polyurethane dispersion and/or a polyacrylate dispersion and a combination thereof, wherein each of said layers are formed from compositions substantially free of volatile organic compounds.

3. The composite structure of claim 1, wherein the support layer is a textile support layer or a support layer made of polyurethane foam, PVC, or polyolefin.

4. The composite structure of claim 2, wherein the lacquer layer is crosslinked with a crosslinking agent selected from a polyisocyanate or a polycarbodiimide.

5. The composite structure of claim 1, wherein the skin layer is made from a polyurethane formulation containing a polyisocyanate functional polyurethane prepolymer and a compound containing reactive hydrogen which is a solid material or a foaming agent, which reactive hydrogen-containing compound is selected from a polyhydrazide, a polysemicarbazide, a polysulfonylhydrazide or a carbodihydrazide, wherein the compound containing reactive hydrogen is both ground and dispersed in a material which is non-reactive towards the compound containing reactive hydrogen.

6. The composite structure of claim 1, wherein the skin layer does not contain acrylic resin.

7. The composite structure of claim 2, wherein the lacquer layer contains a polyacrylate duller, a polyurethane duller, a silica duller, a silicone-based duller or a combination thereof.

8. The composite structure of claim 2, wherein the polyurethane dispersion for forming the adhesive layer or for forming the pre-skin layer has a solids content of more than about 50 wt %.

9. The composite structure of claim 2, wherein the polyurethane dispersion for forming the adhesive layer or for forming the pre-skin layer contains a neutralizing agent selected from a mineral base or a non-volatile tertiary amine or a combination thereof.

10. The composite structure of claim 1, wherein each of the compositions for forming each of the layers has a VOC content of less than about 1000 ppm.

11. The composite structure of claim 1, wherein the total amount of VOC in the components used to make all the layers of the composite structure is less than about 1000 ppm.

12. The composite structure of claim 1, wherein the total amount of VOC in the composite structure is less than about 100 ppm, when recalculated as acetone equivalent, as measured according to the VDA-277 method.

13. The composite structure of claim 1, wherein the amount of VOC in the composite structure is less than about 500 ppm, when recalculated as toluene equivalent, as measured according to the VDA-278 method.

14. The composite structure of claim 1 wherein the composite structure is an artificial leather or a decorative interior material.

15. A method of producing the composite structure of claim 2, comprising the steps of
   a) coating a polyurethane dispersion that is substantially free of volatile organic compounds, on a carrier to a thickness of about 0.05 to about 0.15 mm to form a pre-skin layer upon drying;
   b) coating the pre-skin layer with a polyurethane composition that is substantially free of volatile organic compounds, subsequently heat curing at a temperature of about 150 to about 170° C. to form the skin layer;
   c) coating an adhesive, which is a polyurethane dispersion that is substantially free of volatile organic compounds onto the skin layer to a thickness of about 0.01 to about 0.15 mm, and then adhering a support followed by drying at about 60 to about 90° C. and curing at about 100 to about 130° C.; and
   d) peeling off the carrier.

16. The method of claim 15 further comprising e) applying on top of the pre-skin layer and then drying a lacquer layer made from a polyurethane dispersion and/or a polyacrylate dispersion that is substantially free of volatile organic compounds.

17. The method of claim 15 wherein the support is a fabric positioned on the adhesive.

18. The method of claim 15 wherein the carrier a release paper.

19. A method of producing the composite structure of claim 1, comprising the steps of
  a) coating a carrier with a polyurethane composition that is substantially free of volatile organic compounds, in a thickness of about 0.1 to about 0.4 mm, subsequently heat curing at a temperature of about 150 to about 170° C. to form the skin layer;
  b) coating an adhesive, which is a polyurethane dispersion that is substantially free of volatile organic compounds onto the skin layer to a thickness of about 0.01 to about 0.15 mm, and then adhering a support, followed by drying at about 60 to about 90° C. and curing at about 100 to about 130° C.; and
  c) peeling off the carrier.

20. The method of claim 19 further comprising d) applying on top of the skin layer and then drying a lacquer layer made from a polyurethane dispersion and/or a polyacrylate dispersion that is substantially free of volatile organic compounds.

21. The method of claim 19 wherein the carrier is a release paper.

22. The method of claim 19 wherein the support is a fabric positioned on the adhesive.

\* \* \* \* \*